United States Patent
Wessman

[11] Patent Number: 5,163,476
[45] Date of Patent: Nov. 17, 1992

[54] REGULATOR DEVICE FOR REGULATING FLUID FLOW IN A VALVE BODY

[75] Inventor: Bo Wessman, Eslöv, Sweden

[73] Assignee: Tetra Alfa Holdings S.A., Pully, Switzerland

[21] Appl. No.: 691,366

[22] Filed: Apr. 25, 1991

[30] Foreign Application Priority Data

May 14, 1990 [SE] Sweden ................. 9001727

[51] Int. Cl.⁵ ............................... F16K 1/54
[52] U.S. Cl. ........................ 137/625.3; 251/121
[58] Field of Search ............. 137/625.3, 625.37; 251/121, 122

[56] References Cited

U.S. PATENT DOCUMENTS

| | | |
|---|---|---|
| 2,117,182 | 5/1938 | Lewis ..................... 137/625.3 |
| 2,336,653 | 12/1943 | Taylor .................... 137/625.3 |
| 2,541,176 | 2/1951 | Rockwell ................ 137/625.3 |
| 3,187,775 | 6/1965 | Pinnell .................... 137/625.3 |
| 3,410,521 | 11/1968 | Sowers, III et al. . |
| 4,877,160 | 10/1989 | Derving . |

FOREIGN PATENT DOCUMENTS

| | | |
|---|---|---|
| 120565 | 11/1945 | Australia ................. 137/625.3 |
| 45599 | 5/1932 | Denmark ................. 137/625.3 |
| 0301578 | 2/1989 | European Pat. Off. . |
| 1062507 | 7/1959 | Fed. Rep. of Germany . |
| 1816002 | 6/1970 | Fed. Rep. of Germany . |
| 1903352 | 8/1970 | Fed. Rep. of Germany . |
| 1549239 | 12/1968 | France . |

Primary Examiner—Robert G. Nilson
Attorney, Agent, or Firm—Burns, Doane, Swecker & Mathis

[57] ABSTRACT

A regulator cone of substantially cylindrical form is disclosed with four generally V-shaped grooves on its outer circumferential surface. Two of the grooves define primary grooves that extend along the entire active length of the regulator cone. The other two grooves define secondary grooves that extend along the portion of the active length of the regulator cone where the primary grooves have their largest cross-sectional area.

13 Claims, 3 Drawing Sheets

REGULATOR DEVICE FOR REGULATING FLUID FLOW IN A VALVE BODY

FIELD OF THE INVENTION

The present invention relates to a regulator cone and more particularly, to a regulator cone for a valve, used, for example, in piping systems.

BACKGROUND OF THE INVENTION

Regulator cones with rectangular or V-shaped groves provided on the circumferential surface thereof are previously known in the art, for example from German Patent Specification DE 1062507.

In regulating the flow in a piping system, it is often necessary to obtain an exponential flow characteristic to be able to achieve performance targets. The flow characteristic is defined as the relationship between the flow and the stroke length.

In flow regulation in piping systems which are fed at a substantially constant liquid pressure at one end and, in their other end, discharge towards another lower, substantially constant liquid pressure, i.e. from a pressure tank to an open level vessel, the total pressure drop over the piping system will be distributed between, on the one hand, the pressure drop in the pipes due to flow losses, and, on the other hand, pressure drop over the regulator cone. Thereby, the pressure drop over the regulator cone will be a function of the flow.

In flow regulation in systems in which the pressure drop over the regulator cone is a function of the flow, the surface area characteristic must be steeper than the flow characteristic, since the surface area characteristic must also compensate for the reducing pressure drop over the regulator cone upon increasing flow. The surface area characteristic is defined as the relationship between the regulator surface and the stroke length.

Conventional types of regulator cones do not provide a desired surface area increase, nor do the prior art regulator cones that are provided with V-grooves display such a flow characteristic.

OBJECTS OF THE INVENTION

One object of the present invention is to realize a regulator cone with an exponential flow characteristic which is well-defined in order to be able to obtain rapid and exact regulation of the flow.

A further object of the present invention is to realize a regulator cone of reasonably long stroke length, which is necessary for use together with aseptic diaphragms within, for instance, the food industry.

Yet a further object of the present invention is to realize a regulator cone which is gentle to sensitive products and which is hydienic and easy to clean. Furthermore, the regulator cone according to the invention is less susceptible to wear.

SUMMARY OF THE INVENTION

These and other objects have been attained according to the present invention in that the regulator cone of the type described by way of introduction is of substantially cylindrical form and is provided with an even number of grooves, of which half of the number of grooves, the primary grooves, extend along the entire active length of the regulator cone, and half of the number of grooves, the secondary grooves, extend along a portion of the active length of the regulator cone.

BRIEF DESCRIPTION OF THE ACCOMPANYING DRAWINGS

Preferred embodiments of the present invention will now be described in greater detail hereinbelow, with particular reference to the accompanying drawing figures in which like elements bear like reference numerals and wherein.

DETAILED DESCRIPTION OF THE PREFERRED EMBODIMENTS

Figure 1:
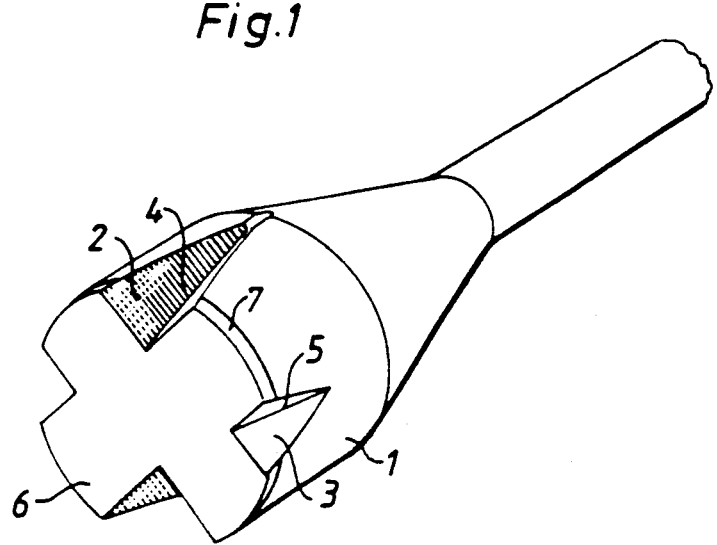
FIG. 1 is a bottom perspective view of a first preferred embodiment of the present invention.
Figure 2:
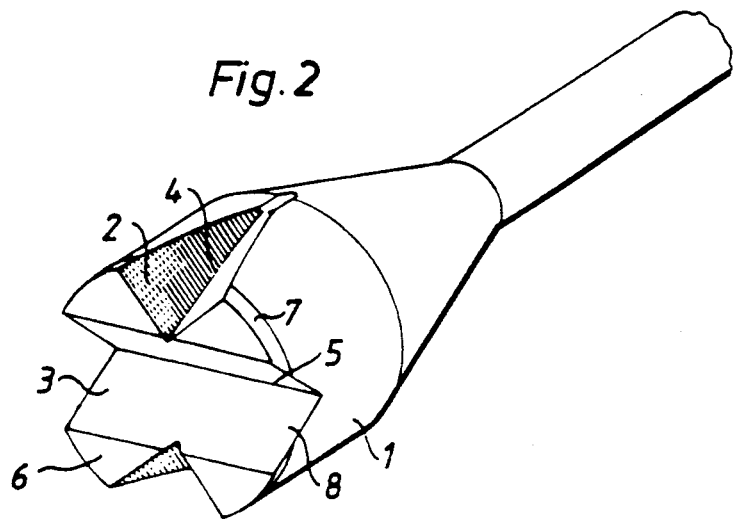
FIG. 2 is a bottom perspective view of a second preferred embodiment of the present invention.

Both of the preferred embodiments as illustrated in FIGS. 1 and 2 show a substantially cylindrical regulator cone 1 on whose circumferential surface there are provided four substantially V-shaped grooves 2, 3, with triangular or quasi-triangular cross-sectional areas. Two of the grooves, the primary grooves 2, extend along the entire length of the regulator cone, while two of the grooves, the secondary grooves 3, extend along a part of the length of the regulator cone 1. In both of the preferred embodiments, the secondary grooves 3 extend along that half of the active length of the regulator cone 1 where the primary grooves 2 have their largest cross-sectional area. The active length of the regulator cone 1 is defined as that substantially cylindrical part of the regulator cone 1 where the regulator cone 1 controls, in relation to a valve seat, the forwardly flowing liquid.

The regulator cone 1 may also be designed with two grooves 2, 3, of which one primary groove 2 and one secondary groove 3. However, this results in a regulator cone 1 which is less capable than the regulator cone 1 of the preferred embodiment of cancelling out the dynamic forces which occur in the liquid flowing forward through the regulator valve.

Furthermore, the regulator cone 1 may be designed with six grooves 2, 3, three primary grooves 2 and three secondary grooves 3. However, this solution results in narrower throughflow channels in the regulator cone 1, which is a drawback for certain foods, for example juice with fruit flesh pieces. Additional grooves 2, 3 in the regulator cone 1 would probably thereby be unsuitable and could even impede manufacture of the regulator cone 1.

In FIG. 1, the two secondary grooves 3 consist of two separate grooves, while, in FIG. 2, they have been connected together into one groove normal to the longitudinal axis of the regulator cone 1. However, in this latter case, they functionally constitute two secondary grooves 3, since the area where the forwardly flowing liquid is permitted to advance is still triangular. In terms of production engineering, it may be an advantage to cause the secondary grooves 3 to consist of one groove which is disposed normal to the longitudinal axis of the regulator cone 1, since, in such instance, it is also possible to make the sides 8 of the grooves convex.

Figure 5:
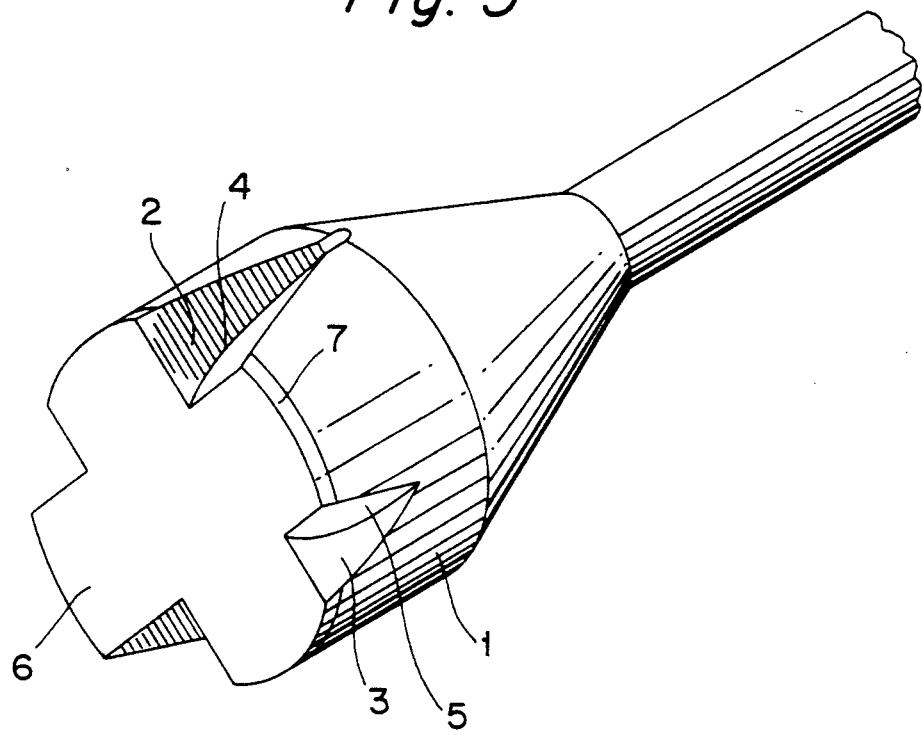

The four grooves may be designed with a straight bottom line 4, 5, but they may also be designed with a curved line (see FIG. 5). Alternatively, some of the grooves, e.g. the secondary grooves, may be designed with a straight bottom line 5, while the bottom line 4 of the primary grooves is curved. At the one defining surface 6 of the regulator cone 1 where the grooves 2, 3 have their largest cross-sectional areas, the regulator cone according to the invention is provided with a bevelled edge 7.

The primary V-grooves 2 and the secondary grooves 3, respectively, are preferably disposed diametrically in order to counterbalance the dynamic forces from the flow of the liquid.

Figure 3:
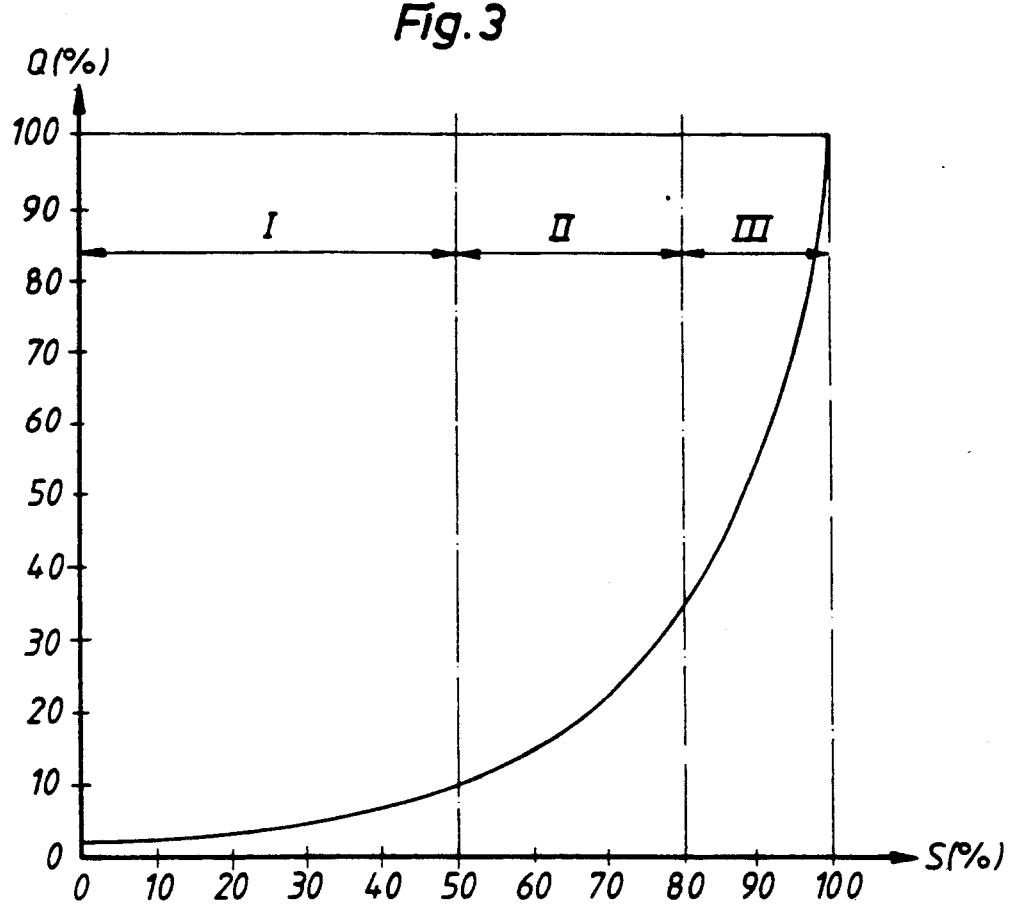
FIG. 3 is a graph illustrating the exponential flow characteristic of the regulator zone according to the present invention.

The surface area characteristic of the regulator cone according to the invention is illustrated diagrammatically in FIG. 3. The one axis of the diagram indicates the stroke length S in per cent and the second axis indicates the cross-sectional area, the regulation area Q in per cent.

In order to be able to physically design regulator cones 1 with reasonable stroke lengths and with area characteristics as steep as are required to achieve an exponential flow characteristic as shown in FIG. 3, use must be made of a design with V-grooves 2, 3 which, already in linearly milled grooves, give an almost square change of the area with the stroke length of the regulator cone. Moreover, use must be made of primary and secondary V-grooves 2, 3 in which, for example during the first half of the stroke length of the regulator cone, only the primary V-grooves 2 are open and, during the latter half of the stroke length, both the primary 2 and the secondary 3 V-grooves are open. By the combination of primary 2 and secondary 3 V-grooves, it is possible to achieve a situation in which the area characteristic during the first part of the stroke length consists of a substantially square relationship and, during the second part of the stroke length, consists of a combination of two substantially square relationships, which together gives an exponential surface area characteristic.

The regulator cone 1 creates its pressure drop by converting pressure into speed which, in turn is converted into heat by vortex formation. This presupposes that the liquid flows in towards that end where the V-grooves 2, 3 of the regulator cone 1 have their largest cross-sectional area, see FIG. 4, and flows out where the area of the V-grooves 2 and 3 is smallest. In the opposite flow direction, the V-grooves 2, 3 act as a diffusor and the kinetic energy of the liquid is more or less completely converted back into compression energy again.

It is possible to finely adjust the surface area characteristic so as to achieve the desired exponential flow characteristic by milling the V-grooves 2, 3 in accordance with a mathematically computed curve form. This curve form may be applied to all of the four V-grooves 2, 3, or alternatively only to the primary V-grooves 2. The mathematical calculations which are employed in order to impart to the regulator cone 1 a "tailor-made" design for its practical application may be used for controlling the regulator valve. In that case in which the regulator valve is employed in filling machines for liquid contents, milk, juice or the like, which are controlled by computer software, the mathematical calculation may be entered direct into the program and by such means a highly exact and rapid regulation of the valve may be achieved.

Figure 4:
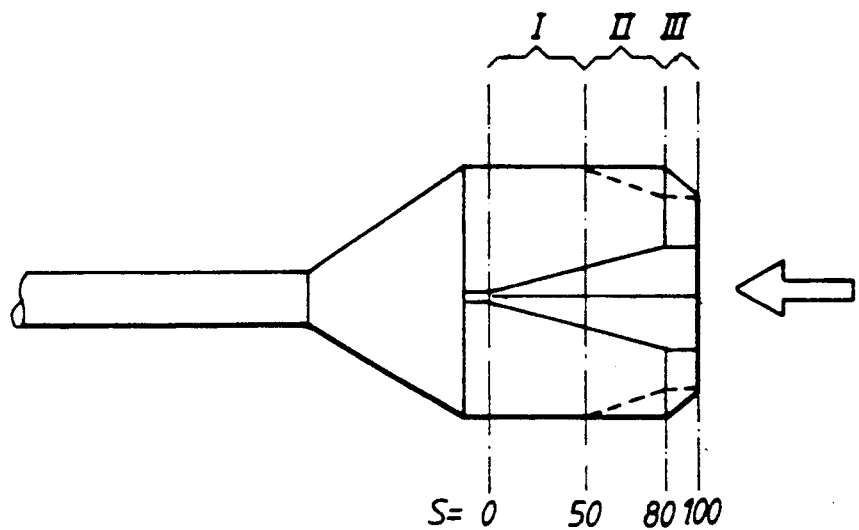
FIG. 4 is a side view of the regulator cone according to the present invention depicting its different operational phases and FIG. 5 is a bottom perspective view of another embodiment of the regulator cone.

As shown in FIGS. 3 and 4, during phase I only the primary grooves 2 are active, i.e. at a stroke length of 0 to 50 per cent. During phase II, the secondary grooves are activated and give the steep surface area characteristic shown by the curve in FIG. 3.

In the preferred embodiment, only 0 to 80 per cent stroke length is employed for regulation. The remaining 20 per cent, i.e. phase III is used on washing of the regulator valve. In particular in the use of the regulator cone 1 according to the present invention in the food industry, in which the hygienic demands are stringent, the regulator cone 1 may be designed with a physical length which is shorter than its stroke length so that, on washing, it is possible wholly to withdraw the regulator cone 1 from the valve seat and thereby avoid tight gaps between the regulator cone 1 and the valve seat, at the same time as a large opening area is provided so as to achieve the correct wash flow. In such instance, the bevel 7 which is disposed on the regulator cone 1 makes an active contribution. The V-shaped grooves 2, 3 are also very easy to wash.

The regulator cone 1 according to the present invention also enjoys major advantages when it is employed for liquid foods including solid particles, since it permits, for instance, fruit flesh pieces to pass, as no narrow gaps are formed between the regulator cone 1 and the valve seat. In earlier designs of regulator cones, this situation would result in a pulsating flow, since fruit flesh pieces could easily become trapped in the narrow gaps formed at this region.

Sensitive food products such as acidulated milk, yoghurt and the like will also be subject to gentler handling using a regulator cone 1 according to the present invention, since, in this case, the liquid is not sheared but is treated in a gentle manner. Today, no regulator valves are employed for such foods, these being pumped instead, in order to ensure as gentle a handling process as possible.

Practical trials have shown that a regulator cone 1 according to the present invention causes less froth formation. In addition, a regulator valve will be obtained which provides silent throttling of the flow and, thereby, a low wear forecast for the regulator cone 1 and the valve seat, because of minimized risk of erosion and cavitation.

As will have been apparent from the above description, the present invention realizes a regulator cone which may be employed for rapid and exact regulation, while not suffering from any of the faults and drawbacks inherent in prior art regulator cones. while this invention has been illustrated and described in accordance with a preferred embodiment, it is recognized that variations and changes may be made and equivalents employed herein without departing from the invention as set forth in the claims.

What is claimed is:

1. A regulator device useable in a valve body for controlling fluid flowing through said body during successive strokes of the regulator device, said regulator device comprising: a substantially cylindrical member having a first end and an oppositely positioned second end so that when in use in a valve body fluid flows from the first end toward the second end, said cylindrical member having four substantially V-shaped grooves formed in an outer circumferential surface thereof, each of said grooves having a cross-sectional area that increases in a direction towards the first end of the cylindrical member, said four grooves including two oppositely positioned primary grooves which extend along substantially the entire length of said cylindrical member and two oppositely positioned secondary grooves that extend along less of the length of said cylindrical member than the primary grooves, the length of the secondary grooves being substantially one-half the length of the primary grooves to achieve an exponential flow characteristic for the regulator device, the secondary grooves extending along the portion of the length of the cylindrical member in which the cross-sectional area of the primary grooves is largest so that during a first half of the stroke of the regulator device the two primary grooves permit fluid flow while the two secondary grooves prevent fluid flow, and during a second half of the stroke of the regulator device the two primary grooves and the two secondary grooves both permit fluid flow.

2. The regulator device according to claim 1, wherein said cone has an end face adjacent the first end thereof, said primary and secondary grooves opening to said end face.

3. The regulator device according to claim 2, wherein said end face and said outer circumferential surface are connected to one another by a bevelled surface.

4. A regulator device for use in a valve to control fluid flow comprising: a generally cylindrical member defining an active length of the regulator device for interacting with a valve seat of the valve to control the flow of material from a first end of the member toward an oppositely located second end of the member during successive strokes of the regulator device, said cylindrical member having an outer circumferential surface in which is formed a plurality of substantially V-shaped grooves, each of said grooves having a cross-sectional area that increases along a longitudinal extent thereof toward one end of the member, said plurality of V-shaped grooves including at least one primary groove that extends substantially the entire active length of the member and at least one secondary groove, said at least one secondary groove extending over substantially one-half the active length of the member to thereby result in an exponential flow characteristic for the regulator device, said at least one secondary groove being positioned with respect to the primary groove such that the at least one secondary groove extends along the portion of the active length of the member in which the primary groove has its largest cross-sectional area so that during a first half of the stroke of the regulator device the at least one primary groove is active for permitting fluid flow while the at least one secondary groove is inactive for preventing fluid flow and during a second half of the stroke of the regulator device the at least one primary groove and the at least one secondary groove are both active for permitting fluid flow.

5. The regulator device according to claim 4, wherein said plurality of grooves is an even number of grooves.

6. The regulator device according to claim 4, wherein said plurality of grooves includes at least four grooves.

7. The regulator device according to claim 4, wherein said at least one primary groove includes at least two diametrically oppositely positioned primary grooves and said at least one secondary groove includes at least two diametrically oppositely positioned secondary grooves.

8. The regulator device according to claim 7, wherein said at least two secondary grooves are interconnected with one another by a groove disposed substantially perpendicular to a longitudinal axis of the cone.

9. The regulator device according to claim 7, wherein the primary grooves and the secondary grooves are defined by converging side walls that meet at a bottom line, the bottom line of at least one of the primary grooves and the bottom line of at least one of the secondary grooves being curved.

10. The regulator device according to claim 4, wherein said primary groove and said secondary groove open to an end face of the cone located at the one end of the cone.

11. The regulator device according to claim 10, wherein the end face of the cone and the circumferential outer surface of the cone are connected to one another by a bevelled surface.

12. The regulator device according to claim 4, wherein the at least one primary groove is defined by converging side walls that meet at a bottom line, the bottom line of the at least one primary groove being curved.

13. The regulator device according to claim 4, wherein the at least one secondary groove is defined by converging side walls that meet at a bottom line, the bottom line of the at least one secondary groove being curved.

* * * * *